Figure 1:
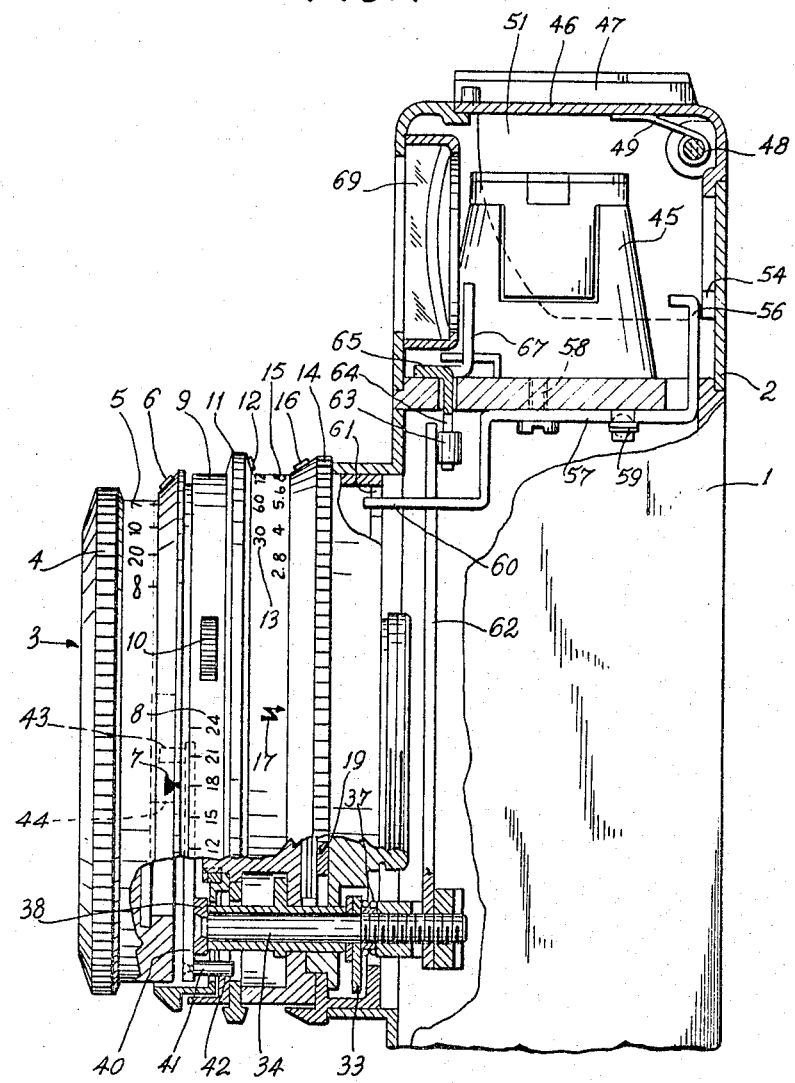

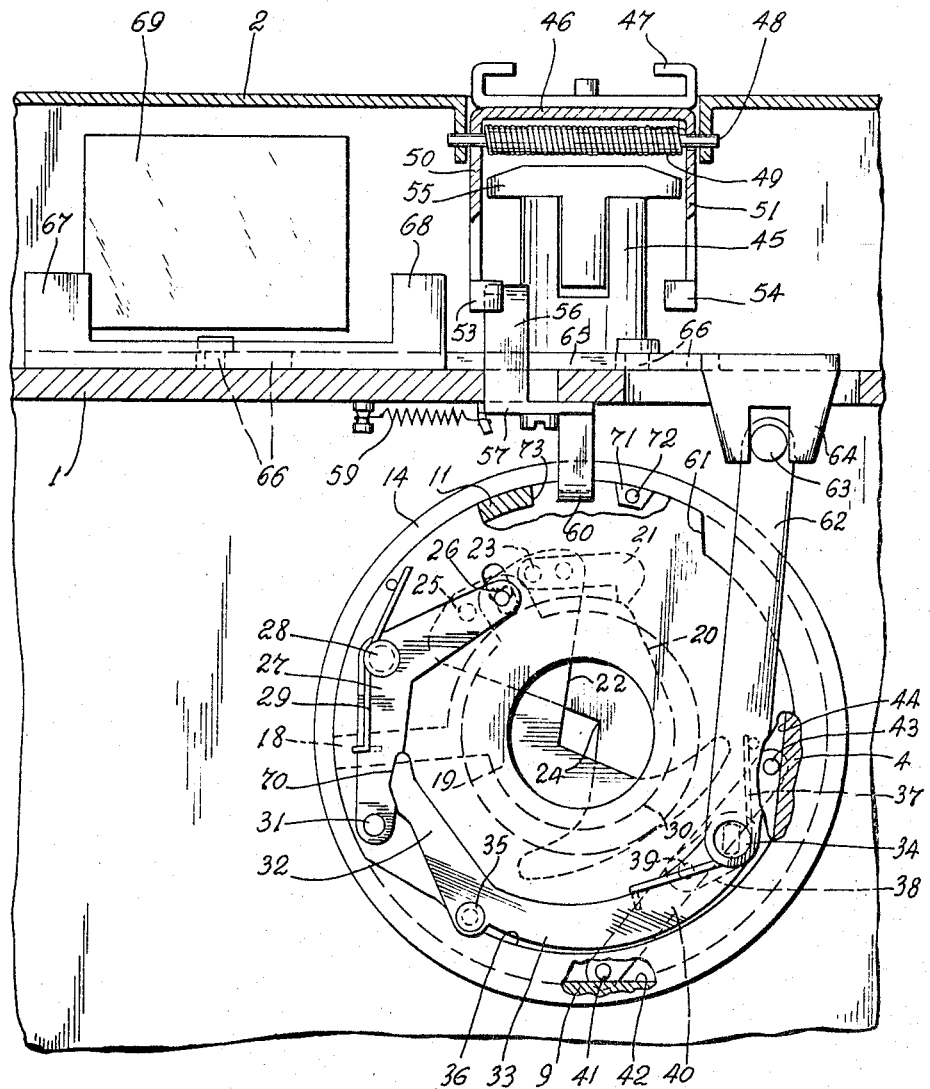

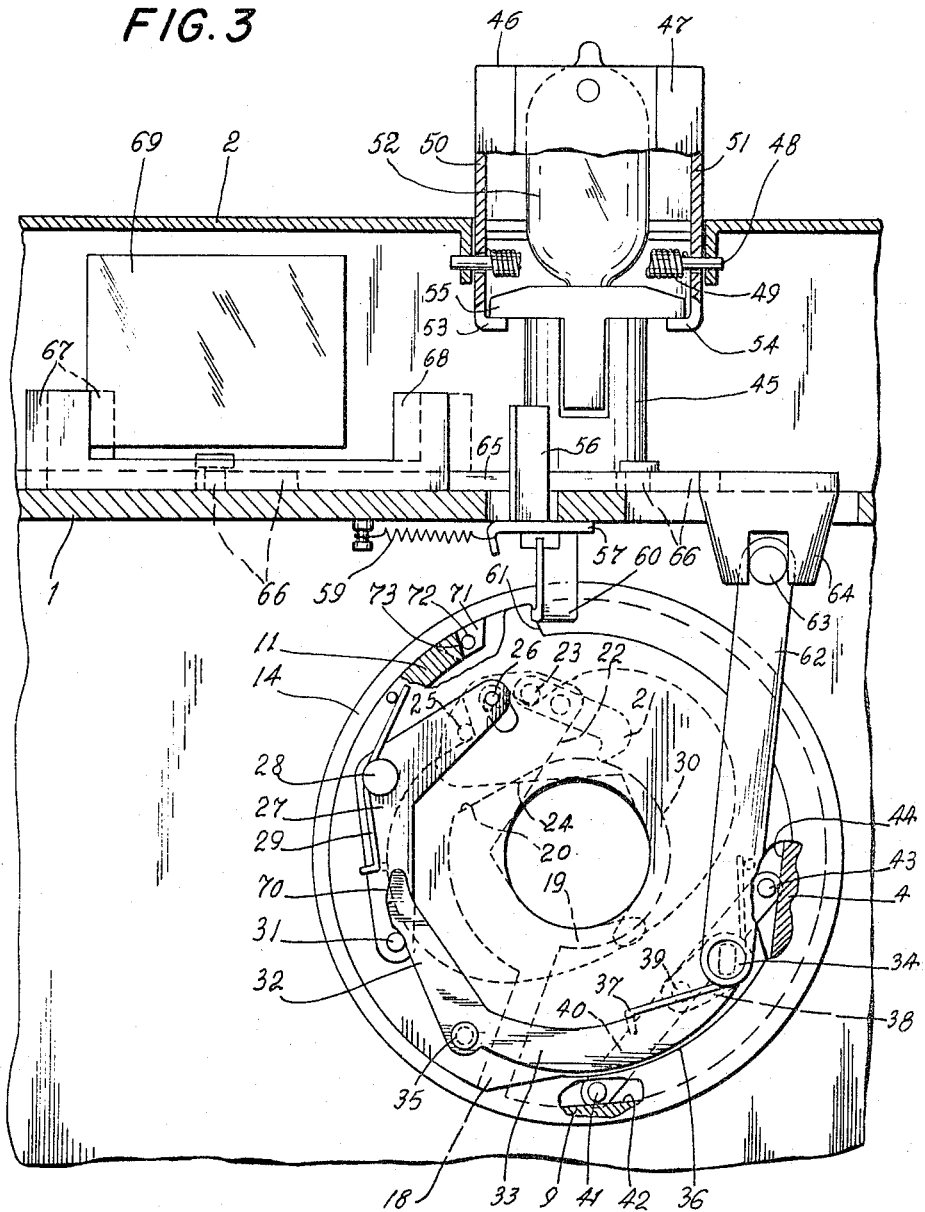

United States Patent Office 3,273,483
Patented Sept. 20, 1966

3,273,483
CAMERA WITH STRUCTURE FOR MAKING ADJUSTMENTS ACCORDING TO FLASH-GUIDE NUMBERS
Herbert Weidner, Steinkamp, and Paul Greger, Braunschweig, Germany, assignors to Voigtlander, A.G., Braunschweig, Germany, a corporation of Germany
Filed Oct. 9, 1964, Ser. No. 402,790
Claims priority, application Germany, Oct. 11, 1963, V 24,693
11 Claims. (Cl. 95—64)

The present invention relates to cameras.

As is well known, there are conventional cameras provided with diaphragms which are capable of being manually adjusted by operation of a manual diaphragm-setting structure. This latter structure can also be placed by the operator in a position where it is incapable of adjusting the diaphragm and where instead the diaphragm can be automatically adjusted in accordance with the lighting conditions by a suitable structure which automatically senses the lighting conditions and is connected with the diaphragm for automatically setting the diaphragm when the manual diaphragm-setting structure is placed in a suitable position beyond the range of manual diaphragm adjustments.

It is a primary object of the present invention to provide for a camera of this latter general type a structure which enables the diaphragm to be automatically set when the manually adjustable structure is in a position incapable of manually adjusting the diaphragm, in accordance with a combination of the settings of the objective at a predetermined distance and of the camera according to the speed of the film therein, so that in this way the setting normally used for automatic diaphragm-setting according to the lighting conditions can be used for automatic setting of the diaphragm according to a flash guide number.

In particular, it is an object of the present invention to provide for a camera of the above type a structure capable of manually setting the diaphragm of the camera as long as a diaphragm-setting means thereof is in a manually operable range of adjustments, and capable of automatically setting the diaphragm when the diaphragm-setting means is displaced to a non-adjusting position in accordance with the combined settings of the distance between the camera and the object to be photographed and the setting of a film speed setting means according to the speed of the film which is in the camera, the structure including a means which reliably prevents automatic setting of the diaphragm as long as the diaphragm-setting means is in its manually operable range and which will automatically render the diaphragm automatically settable in the above-referred manner when the diaphragm-setting means is displaced to its non-adjusting position.

Also, the objects of the present invention include a structure for combining the settings of the distance between the camera and the object to be photographed and the speed of the film set into the camera in a manner which will automatically set the diaphragm according to the combination of these settings to provide a proper exposure for a given flash lamp and a given speed of the film which is in the camera.

Also, it is an object of the present invention to provide a structure which will render the automatic diaphragm-setting structure inoperative when the diaphragm-setting means is in its manually operable range of adjustments and which will render the manual adjustment of the diaphragm inoperative when the diaphragm setting means is in its non-adjusting position.

In addition, it is an object of the invention to provide a structure which will indicate to the operator when it is not possible to make a proper exposure with the particular settings of the camera.

Furthermore, it is an object of the present invention to provide a structure which will automatically render a built-in flash assembly operative when the diaphragm-setting means is displaced to its non-adjusting position.

Further, it is an object of the invention to provide a structure which will introduce automatically into the camera a predetermined exposure time when the diaphragm-setting means is placed in its non-adjusting position.

The invention is illustrated by way of example in the accompanying drawings which form part of the application and in which:

FIG. 1 is a partly sectional side view of one possible structure of a camera according to the present invention;

FIG. 2 is a fragmentary partly sectional rear view of the camera of FIG. 1 showing the parts in a position where the diaphragm is capable of being manually adjusted; and FIG. 3 is a rear view of the camera of FIG. 1 showing the same parts as those of FIG. 2 but in a position where the diaphragm is capable of being automatically adjusted in accordance with the combination of settings for film speed and distance between the camera and the object to be photographed.

Referring now to the drawings, there is shown therein a camera housing 1 provided at its upper part with a cap 2 which cooperates with the top wall of the camera housing 1 to provide a chamber in which a viewfinder and a built-in flash assembly are located. The camera also includes an objective unit 3 which includes the structure for carrying the lenses of the objective as well as the structure for carrying a between-the-lens shutter. The objective assembly 3 includes a distance setting means 4 in the form of a rotary ring having a scale 5 of distance settings, this scale 5 cooperating with a stationary index 6. The stationary objective structure which carries the stationary index 6 also carries a stationary index 7 with which a scale 8 of film speeds cooperates, this scale 8 being carried by a rotary adjusting ring 9 which forms a film speed setting means and which is set by the operator to align that graduation of the scale 8 with the index 7 which corresponds to the speed of the film which is to be exposed in the camera. The adjusting ring 9 carries a plurality of knurled projections 10 to make it convenient for the operator to turn the film speed setting means 9. The objective assembly 3 also includes an exposure time setting ring 11 which has an index 12 capable of cooperating with a stationary scale 13 of exposure times. Also, the objective assembly includes a diaphragm-setting means in the form of a rotary ring 14 which carries an index 16 which is adjustable with respect to the scale 15 of the diaphragm apertures. The range of the scale 15 forms a manually operable setting range for the diaphragm-setting means 14, and as long as the index 16 is situated in the range of the scale 15 it is possible for the operator to manually set the diaphragm. The diaphragm-setting means 14, however, has an additional non-adjusting position situated beyond the manually operable range determined by the scale 15, and in this non-adjusting position of the diaphragm-setting means it is not possible for the operator to manually set the diaphragm. The stationary part of the objective which carries the stationary scales 13 and 15 carries a flash symbol 17 with which the index 16 is aligned in order to place the diaphragm-setting means 14 in its non-adjusting position.

Referring now to FIGS. 2 and 3, it will be seen that the rotary diaphragm adjusting ring 14 is fixed with a radially extending arm 18 which projects radially from the ring 14 inwardly toward the optical axis, and the inner end of the arm 18 fixedly carries a cam 19 which surrounds the optical axis. The annular cam 19 which surrounds the optical axis turns with the ring 14 above the optical axis and is provided at its outer periphery with a camming edge 20. This cam forms part of a transmission means for transmitting movement of the diaphragm-setting means 14 to the diaphragm for setting the latter when the diaphragm-setting means 14 is in its manually operable range, and this transmission means also includes a cam-follower 21 which has a free end engaging the camming edge 20 and which is fixed to one of the diaphragm blades 22. The particular diaphragm illustrated in the drawings includes a pair of diaphragm blades 22 and 24, and the blade 22 is supported for turning movement about a stationary pivot pin 23 which also forms the pivot axis for the cam-follower 21. The second diaphragm blade 24 is supported for turning movement by a stationary pivot pin 25, these pivots being carried by a suitable stationary transverse wall of the objective assembly in a manner well known in the art. Both of the blades 22 and 24 are formed with substantially V-shaped notches which overlap each other to provide the diaphragm aperture in the manner shown in the drawings. In addition, the blades 22 and 24 are formed with overlapping control slots which receive a pin 26 which extends through these overlapping control slots in such a way that turning of the blade 22 will provide through the pin 26 equal and opposite turning of the blade 24. In this way the blades 22 and 24 are coupled to each other so as to determine the aperture of the diaphragm. This pin 26 also forms part of the transmission means for setting the diaphragm, and this transmission means further includes a transmission lever 27 which at one end fixedly carries the pin 26 and which is supported for turning movement by a stationary pivot pin 28 which at the same time supports a spring 29 which at one end engages the lever 27 to urge the latter to turn in a counterclockwise direction, as viewed in FIGS. 2 and 3. This tendency of the lever 27 to be turned by the spring 29 in a counterclockwise direction urges the pin 26 away from the optical axis with result that the pin 26 acts on the overlapping slots of the blades to urge the blade 22 in a clockwise direction and the blade 24 in a counterclockwise direction, so that the spring 29 acts on the transmission means to tend to provide the largest possible aperture, and it is this direction of turning of the blade 22 in the direction providing the largest possible aperture which maintains the cam-follower 21 in engagement with the camming edge 20.

The parts are illustrated in FIG. 2 in the position they take when the transmission means has been acted upon by the diaphragm-setting means 14 to provide through the cam 19 and the cam-follower 21 as well as the blade 22 the smallest possible diaphragm aperture. When the ring 14 is turned in a counterclockwise direction, as viewed in FIG. 2, the cam 19 will also turn in a counterclockwise direction with the result that the spring 29 will act on the cam-follower 21 to turn the latter together with the blade 20 in a clockwise direction, as viewed in FIG. 2, so that in this way the diaphragm aperture is increased, and the continued turning of the ring 14 through its manually operable range is capable of providing the largest possible aperture, and in this manner the cooperation of the index 16 with the scale 15 will provide selected apertures.

When the diaphragm-setting means 14 is turned beyond the largest possible aperture setting of the scale 15 so as to displace the index 16 into alignment with the flash symbol 17, a portion 30 of the camming edge 20 engages the cam-follower 21, and this portion 30 extends along a circle whose center is in the optical axis about which the cam ring 19 turns, so that when the camming edge portion 30 engages the cam-follower 21 it will not be possible to provide any change in the setting of the diaphragm by movement of the diaphragm-setting means 14. Thus, alignment of the index 16 with the symbol 17 locates the diaphragm-setting means in its non-adjusting position, and this is the position of the parts which is illustrated in FIG. 3.

The displacement of the diaphragm-setting means 14 from its manually operable range to its non-adjusting position where the index 16 is aligned with the flash symbol 17 results not only in situating the diaphragm at its fully open position, but in addition this movement results, in a manner described below, in coupling the diaphragm blades 22 and 24 with the structure for setting the objective at a given distance between the camera and the object to be photographed and with the structure for setting into the camera the factor of the speed of the film which is situated therein, so that as result of this coupling it is possible to automatically adjust the diaphragm, when the diaphragm-setting means 14 is in its non-adjusting position, in a manner which will provide proper exposures for the particular flash guide number.

When the diaphragm is manually set at its largest aperture, the lever 27 turns about the pivot 28 to a position where a portion 31 of the transmission lever 27, in the form of a pin fixed to an extension therefrom, comes into engagement with an edge portion of an arm 32 of a coupling lever 33 which forms a coupling means for coupling the transmission means to the distance setting and the speed setting means. The elongated coupling lever 33 is fixed to a shaft 34 which extends parallel to the optical axis and which is supported for rotary movement by the objective assembly in the manner shown most clearly at the lower part of FIG. 1. The coupling lever 33 supports for angular adjustment a pin 35 which has an eccentric portion engaging, in the position of the part shown in FIG. 2, a camming edge 36 which forms part of the diaphragm-setting ring 14. This camming portion 36 of the diaphragm-setting means 14 remains in engagement with the eccentric portion of the pin 35 as long as the diaphragm-setting means is in its manually operable range where the index 16 cooperates with the scale 15, and at this time the cam 36 cooperates with the pin 35 to maintain the coupling lever 32 beyond the range of movement of the pin 31 of the transmission lever 27, so that as long as the diaphragm-setting means 14 is in its manually operable range it is not possible for the diaphragm adjustment to be influenced by the coupling lever 33. A spring means formed by a spring 37 which surrounds the rotary shaft 34 engages with one of its arms an edge of the coupling lever 33 to urge the latter and the shaft 34 in a counterclockwise direction, as viewed in FIGS. 2 and 3, and thus this spring means 37 maintains the pin 35 in engagement with the cam 36 of the diaphragm-setting means 14. When the diaphragm-setting means 14 is displaced to the non-adjusting position shown in FIG. 3, the cam portion 36 of the diaphragm-setting means moves beyond the range of the pin 35, and now the coupling lever 33 together with the shaft 34 are free to turn so that the arm 32 will engage the pin 31 and turn the lever 27. The turning of the lever 27 at this time by the coupling lever 33 will result in displacement of the pin 26 so that by cooperation of the overlapping slots of the blades 22 and 24 it is possible for the displacement of the pin 26 to control the position of the blades 22 and 24 and thus determine the size of the diaphragm aperture. During this time the cam-follower 21 will move through a greater or lesser distance away from the camming edge 30 of the ring 19 depending upon the degree to which the lever 27 is turned by the coupling means 33.

The angular position of the shaft 34 and the coupling lever 33, which determines the diaphragm-setting when the index 16 is aligned with the symbol 17, is automatically determined by a differential means capable of providing for the shaft 34 and the lever 33 an angular position in accordance with the combined positions of the distance setting means 4 and the film speed setting means 9.

For this purpose the shaft 34 fixedly carries an arm 38 which in turn carries a pivot pin 39 which serves to support for turning movement a differential lever 40 which forms part of the differential means for combining the settings of the distance and film speed to determine from this combination the angular position of the lever 33 and thus the angular position of the lever 27 so as to automatically determine the diaphragm-setting. The differential means includes in addition to the differential lever 40 a pair of cam-follower portions in the form of pins 41 and 43 fixed to and projecting from the lever 40 in directions parallel to the optical axis. The film speed setting ring 9 fixedly carries a cam 42 which is engaged by the cam-follower pin 41 of the differential means, and thus the cam 42 will cooperate with the pin 41 for imparting to the differential lever 40 a position determined by the film speed setting. The pin 43 engages a cam 44 which is fixed to the distance setting ring 4 of the objective assembly 3, so that the cooperation of the cam 44 with the pin 43 will impart to the differential lever 40 an angular position according to the distance setting of the objective. The spring 37 serves not only to urge the lever 33 and the shaft 34 in a counterclockwise direction, as viewed in FIGS. 2 and 3, in addition this spring acts through the shaft 34 and the arm 38 on the lever 40 for maintaining the cam-follower pins 41 and 43 respectively in engagement with cams 42 and 44.

The turning of the film speed adjusting ring 9 will cause the cam 42 to act on the pin 41 and the lever 40 to provide a corresponding position for the latter. With a subsequent adjustment of the distance setting ring 4 the cam 44 will move so as to act on the pin 43. The result is that the lever 40 turns about the position determined by the location of the pin 41 on the cam 42. As a result the location of the pivot 39 of the lever 40 will change, so that the arm 38 will turn and will provide a corresponding turning of the shaft 34. This turning of the shaft 34 will of course result in turning of the coupling lever 33 which will in turn move the transmission lever 27 so as to result in a change in the setting of the diaphragm, and the diaphragm-setting will of course correspond to the setting of the film speed and the distance setting, this diaphragm-setting of course being determined in accordance with the light intensity of a predetermined flash lamp. The change in the distance setting will change in the above-described manner the diaphragm setting in a manner which will correspond to the flash guide number. If the film speed setting means 9 is adjusted, there is also a corresponding change in the diaphragm-setting, since at this time the lever 40 is turned about the position determined by the location of the pin 43 at the cam 44, as a result of the displacement of the cam 42 and the pin 41 with respect to each other. Therefore, the position of the pivot 39 will also change at this time to provide a corresponding change in the angular position of the shaft 34 wihch will result in the above-described manner in a change in the diaphragm-setting.

If the diaphragm-setting means 14 is returned from the position of FIG. 3 into the position of FIG. 2, then the camming edge 36 will again engage the eccentric pin 35 so as to displace the coupling lever 33 to a position situating its arm 32 at a location corresponding to the largest possible opening of the diaphragm, and thus the coupling lever 33 at this time, and of course all of the parts connected therewith, cannot participate in the setting of the diaphragm. The setting of the diaphragm now will take place only in accordance with the manual turning of the ring 14 along its manually operable range, as a result of cooperation of the camming edge 20 with the cam-follower 21.

The camera of the invention has a built-in flash means. This flash structure includes a lamp socket 45 situated within the cap 2. The opening at the top of the cap through which the flash lamp is introduced into the lamp socket 45 is closed by a swingable cover 46 when the flash structure is in an inoperative position, this swingable cover 46 carrying a shoe 47. The cover 46 is supported for pivotal movement by an elongated rod 48 which is supported by lugs of the top wall of the cap 2. A spring 49 is coiled about the rod 48 and seeks to turn the cover 46 into the open, operative position thereof illustrated in FIG. 3, and to maintain the cover 46 in the operative position of FIG. 3. The inner surface of the cover 46 forms together with the side walls 50 and 51 of the cover a reflector for the lamp 52 which is set into the socket 45. In order to limit the opening movement of the cover 46, the side walls 50 and 51 are respectively provided with inwardly directed lugs 53 and 54 which engage the underside of a flange 55 of the socket 45, and the parts are shown in this position in FIG. 3. In its closed position which is shown in FIGS. 1 and 2, the cover 46 is releasably maintained in its closed, inoperative position by a releasable lock means, as is particularly apparent from FIG. 2 which shows how the lug 53 is engaged by a lock arm 56 to prevent the spring 49 from turning the cover 46 from its inoperative to its operative position. The lock arm 56 forms part of a lock lever 57 of the releasable lock means, this lever 57 being supported for turning movement by a suitable pivot 58 which is shown in FIG. 1, and a spring 59 is connected to the lever 57 so as to urge the latter into its locking position where the arm 56 engages the lug 53 to prevent the flash means from assuming its operative position. A second arm 60 extends downwardly from the lock lever 57 and is situated in the path of movement of a projection 61 of the diaphragm-setting ring 14, so that when this ring 14 is turned to displace the index 16 in alignment with the flash symbol 17, the projection 61 engages the arm 60 so as to turn the lock lever 57 in opposition to the spring 59 to a position in which the lock arm 56 is displaced beyond the lug 53 so as to release the cover 46 to the spring 49 which now snaps the cover up to its operative position shown in FIG. 3.

Thus, the snapping of the cover 46 to its operative position renders the flash means operative, and this operation will automatically take place whenever the diaphragm-setting means 14 is turned beyond its manually operable range to its non-adjusting position where the index 16 is aligned with the flash symbol 17. In order to return the parts to their inoperative position, the operator will depress the cover 46 in opposition to the spring 49 to the position indicated in FIG. 2, and then the operator will turn the ring 14 so that its index 16 is situated in the manually operable adjusting range determined by the scale 15, and the result is that the projection 61 will move away from the arm 60 so that the spring 59 will be capable of displacing the lock arm 56 in front of the lug 53 to maintain the flash means in its inoperative position.

The above-described structure for adjusting the diaphragm is also coupled with an indicating means which is capable of indicating, when the index 16 is aligned with the symbol 17, those positions of the distance setting means or film speed setting means which will require diaphragm-settings which cannot be made by the camera. It can happen that, for example, in order to photograph with flash illumination a subject at a distance of one meter from the camera, there is used with the camera a type of flash lamp and a film whose speed will give a flash guide number of "48". In order for proper exposure of the film, it is necessary to adjust the diaphragm to a setting of "48". The particular diaphragm, however, cannot be set beyond the setting "22". An exposure made with this smallest possible setting "22" of the diaphragm will result in an overexposure under these conditions. On the other hand, it is possible that with a given flash guide number of, for example, "8.4" it is desired to photograph an object which is situated at six meters from the camera so that the distance setting ring 4 is set at the distance of six meters, so that an aperture setting of "1.4" will be required, whereas the largest possible aperture with the diaphragm is, for example, "2.8". An exposure made under these conditions will of course result in underexposure.

These types of errors are avoided with the indicating means described below.

As is apparent from the drawings, the shaft 34, in addition to being connected with the coupling lever 33 and the arm 38, is also fixed with an adjusting lever 62. This lever 62 carries at its upper end a pin 63 which is received in a notch of a lug 64 of an elongated slide member 65 which is guided for horizontal movement to the right and left, as viewed in FIGS. 2 and 3 by a suitable pin-and-slot guiding structure 66. The elongated slide member 65 is supported by the top wall of the camera housing within the cap 2, and the slide member 65 carries a pair of warning lugs 67 and 68 which are so positioned that in given positions of the slide member 65 one or the other of these lugs will be visible in the viewfinder of the camera. FIG. 3 shows in dotted lines a position of the slide 65 where the warning lug 67 overlaps the lens 69 of the viewfinder.

The slide 65 is shifted by the lever 62 in accordance with the angular position of the shaft 34.

Referring now to FIG. 3, assume, for example, that with use of a predetermined conventional type flash lamp and with a film which has a speed of 15 DIN a flash guide number of "8.4" is determined. If the diaphragm 22, 24 has a range of adjustment between the settings "2.8" and "22", then at the largest aperture of "2.8" it is possible to still provide a sufficiently bright illumination of an object which is spaced by a distance of three meters in front of a camera.

The parts are shown in FIG. 3 in, for example, this particular setting where the ring 19 provides a film speed setting of 15 DIN, where the distance setting ring 4 is positioned at a setting of three meters, and where the diaphragm has an aperture of "2.8".

If now it is desired to photograph an object which is situated in front of the camera by a distance of, for example, six meters, the turning of the distance setting ring 4 to the setting of six meters will result in movement of the cam 44 with respect to the pin 43 in a direction providing a clockwise turning of the shaft 34, as viewed in FIGS. 2 and 3, and thus a corresponding turning of the coupling lever 33 and adjusting lever 62. The turning of the lever at this time, however, cannot be followed by the pin 31 of the transmission shaft 27, because the diaphragm is already at its largest possible setting. Therefore, the diaphragm does not participate in the setting of the distance ring 4. As a result an improper exposure will be made and this fact is made known to the operator by the adjusting lever 62 which at this time shifts the slide member 65 to a position which locates the warning flag 67 in the field of view of the viewfinder, as shown in dotted lines in FIG. 3.

If, on the other hand, for example, use is made of a film which has a speed of 30 DIN and a corresponding setting of the film speed ring 9 indicates that with a conventional flash lamp a flash guide number of, for example, "48" is proper, then the diaphragm requires a setting of "22" in order to properly expose a subject situated at a distance of two meters in front of the objective. If, however, the operator seeks to set the camera to photograph an object situated, for example, at a distance of 1.20 meters in front of the camera with the distance setting ring 4 situated at this latter setting, then the movement of the cam 44 will act through the pin 43 on the lever 40 and the arm 38 to turn the lever 34 in a counterclockwise direction, as viewed in FIGS. 2 and 3. This movement of the coupling lever 33, however, should not be transmitted through the transmission lever 27 to the diaphragm blades for setting the latter, inasmuch as they cannot be moved beyond the position providing the smallest possible aperture setting of "22". In order to take care of such an occurrence the edge portion of the arm 32 which engages the pin 31 has a part 70 which extends along a circle whose center is in the axis of the shaft 34, which is the turning axis of the coupling lever 33, so that at this time when the coupling lever 33 turns to attempt to provide a diaphragm-setting smaller than the smallest possible diaphragm setting, only the circular edge portion 70 will move along the pin 31 and there will be no forcing of the structure to attempt to provide a setting smaller than the smallest possible diaphragm aperture. Thus, in spite of the turning of the coupling lever 33 the diaphragm remains at its smallest aperture. Therefore, at this time also the diaphragm does not participate in the movement of the distance setting ring 4, and since at this time also an improper exposure will be made, this fact is made known to the operator by the adjustment of the slide members 65 by the lever 62 which at this time displaces the slide 65 in a position which renders the warning lug 68 visible to the operator in the viewfinder.

As may be seen from FIGS. 2 and 3, the diaphragm-setting ring 14 carries an additional lug 71 which in turn carries a motion-transmitting pin 72. The exposure time setting ring 11 has a stop surface or shoulder 73 which is situated in the path of turning of the pin 72 when the diaphragm-setting means 14 is displaced beyond the manually operable range to the non-adjusting position. Thus, when the operator turns the index 16 beyond the scale 15 to the symbol 17, the pin 72 engages the shoulder 73 of the exposure time setting ring 11 so as to turn the latter together with the diaphragm-setting ring 14. In this way the exposure time setting ring 11 will be turned together with the diaphragm-setting ring 14 when the latter is displaced to its non-adjusting position. The position of the pin 72 and the stop shoulder 73 are so chosen that when the index 16 is in alignment with the flash symbol 17, the exposure time setting ring 11 will provide an exposure time of a predetermined value, preferably $\frac{1}{30}$ sec. This exposure time setting ring 11 therefore is displaced out of whichever setting it previously had into this predetermined setting when the diaphragm-setting means is displaced to its non-adjusting position.

What is claimed is:

1. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, said differential means including a differential lever having a pair of spaced cam-follower portions, a pair of cams respectively connected wtih said distance setting means and said film speed setting means for assuming positions determined by the positions of said distance setting means and film speed setting means, respectively, spring means acting on said differential lever for maintaining said cam-follower portions thereof respectively in engagement with said cams so that the position of said differential lever will be determined according to the combined settings of said distance setting means and film speed setting means, and said coupling means including a coupling lever operatively connected to said differential lever to be angularly moved thereby for transmitting movement of said differential lever to said transmission means for actuating the latter to adjust the diaphragm automatically when said diaphragm-setting means is in said non-adjusting position thereof, said diaphragm-setting means having a camming portion engaging said coupling lever for maintaining the latter out of operative engagement with said transmission means when said diaphragm-setting means is in said manually operable range thereof and releasing said coupling lever for operative engagement with said transmission means when said diaphragm-setting means is in said non-adjusting position thereof.

2. In a camera as recited in claim 1, a rotary shaft fixed to said coupling lever, and an arm fixed to said rotary shaft and pivotally connected with said differential lever so that movement of the latter will be transmitted through said arm to said shaft for turning said coupling lever so as to actuate said transmission means when said diaphragm-setting means is in said non-adjusting position thereof.

3. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, said differential means including a differential lever carrying a pair of cam-follower pins, a pair of cams respectively fixed to said distance setting means and film speed setting means for assuming positions determined by the settings of said distance setting means and film speed setting means, a rotary shaft operatively connected with said differential lever to be turned in response to turning of said differential lever, said coupling means including an elongated coupling lever fixed to said shaft and extending therefrom to co-act with said transmission means when said diaphragm-setting means is in said non-adjusting position thereof, and spring means operatively connected to said shaft and coupling lever for turning them in a direction maintaining said pins in engagement with said cams, respectively, and actuating said transmission means to automatically set the diaphragm when said diaphragm-setting means is in said non-adjusting position thereof.

4. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, said coupling means including an elongated coupling lever co-acting with said transmission means for actuating the latter to set the diaphragm when said diaphragm-setting means is in said non-adjusting position thereof, said diaphragm-setting means having a cam engaging said coupling lever to maintain the latter out of operative relationship with respect to said transmission means when said diaphragm-setting means is in said manually operable range thereof, said cam being situated beyond said coupling lever when said diaphragm-setting means is in said non-adjusting position thereof for releasing said coupling lever to co-act with said transmission means.

5. In a camera as recited in claim 4, an angularly adjustable eccentric pin carried by said coupling lever and engaging said cam of said diaphragm-setting means when the latter is in said manually operable range thereof.

6. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, said transmission means including a transmission lever and said coupling means including an elongated coupling lever having a pivoted end and having distant from said pivoted end an edge portion engaging a portion of said transmission lever when said diaphragm-setting means is in said non-adjusting position thereof for actuating said transmission lever.

7. In a camera as recited in claim 6, said edge portion of said coupling lever which engages said portion of said transmission lever having at least in part a curvature extending along a circle whose center is in the turning axis of said coupling lever.

8. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, said diaphragm including a pair of overlapping diaphragm blades respectively formed with overlapping slots through which a pin extends for transmitting turning of one of said diaphragm blades to the other of said diaphragm blades, said transmission means including a cam-follower fixed to said one blade and a cam fixed to said diaphragm-setting means to be turned thereby and engaging said cam-follower for adjusting said blades when said diaphragm-setting means is in said manually operable range thereof, said cam having a portion forming part of a circle whose center is in the optical axis and engaging said cam-follower when said diaphragm-setting means is in said non-adjusting position thereof so as to prevent movement of said cam-follower and thus prevent adjusting of the diaphragm when said diaphragm-setting means is in said non-adjusting position thereof, said transmission means including a transmission lever fixed to said pin and said coupling means including a coupling lever engaging said transmission lever for turning the latter only when said diaphragm-setting means is in said non-adjusting position thereof for adjusting said blades by movement of said pin in response to turning of said transmission lever.

9. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, a rotary shaft interconnecting said differential means with said coupling means, an elongated lever fixed to said shaft for turning movement therewith, and indicating means operatively connected to said lever for indicating the limits of the adjustable range of the diaphragm so that the operator will know when the camera will not make a proper exposure.

10. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, flash means carried by the camera for movement between operative and inoperative positions, lock means releasably locking said flash means in said inoperative position thereof, and a projection carried by said diaphragm-setting means and engaging said lock means to move the latter to a position releasing said flash means for movement from said inoperative to said operative position thereof when said diaphragm-setting means is moved to said non-adjusting position thereof.

11. In a camera, an objective having a distance setting means for setting the objective according to the distance between the camera and an object to be photographed thereby, film speed setting means for setting into the camera the speed of the film to be exposed therein, and diaphragm-setting means having a manually operable range and a non-adjusting position situated beyond said manually operable range, a diaphragm, transmission means operatively connected to said diaphragm-setting means and said diaphragm for transmitting movement of said diaphragm-setting means to said diaphragm for adjusting the latter only when said diaphragm-setting means is in said manually operable range thereof, said transmission means preventing adjustment of said diaphragm by said diaphragm-setting means when the latter is in said non-adjusting position thereof, differential means operatively connected to said distance setting means and said film speed setting means for assuming positions determined by the combination of the settings of said distance setting means and said film speed setting means, and coupling means coupling said differential means to said transmission means only when said diaphragm-setting means is in said non-adjusting position thereof for actuating said transmission means to automatically adjust the diaphragm according to the combined settings of said distance setting means and film speed setting means when said diaphragm-setting means is in said non-adjusting position thereof, exposure time setting means, and a projection fixed to said diaphragm-setting means and engaging said exposure time setting means when said diaphragm-setting means is displaced to said non-adjusting position thereof for automatically displacing said exposure time setting means to a position providing a predetermined exposure time when said diaphragm-setting means is placed in said non-adjusting position thereof.

References Cited by the Examiner

UNITED STATES PATENTS

| | | | |
|---|---|---|---|
| 2,965,011 | 12/1960 | Rentschler | 95—64 |
| 3,018,710 | 1/1962 | Rentschler | 95—64 |
| 3,071,056 | 1/1963 | Gebele | 95—64 |
| 3,198,096 | 8/1965 | Koppen | 95—64 |

NORTON ANSHER, *Primary Examiner.*

CLIFFORD B. PRICE, *Assistant Examiner.*